United States Patent [19]

LaSalle et al.

[11] Patent Number: 5,613,904
[45] Date of Patent: Mar. 25, 1997

[54] UTENSIL FOR OPENING THE SHELLS OF CRUSTACEANS

[75] Inventors: Anthony LaSalle; Betty V. LaSalle, both of Overland, Kans.

[73] Assignee: LaSalle Product Development, Inc., Overland Park, Kans.

[21] Appl. No.: 703,489

[22] Filed: Aug. 27, 1996

Related U.S. Application Data

[63] Continuation-in-part of Ser. No. 533,374, Sep. 25, 1995, abandoned, and a continuation-in-part of Ser. No. 595,066, Feb. 1, 1996.

[51] Int. Cl.$^6$ ..................................................... A22C 29/02
[52] U.S. Cl. ............................................. 452/6; 30/120.1
[58] Field of Search ................................. 452/6, 1, 2, 5, 452/17; 30/120.1

[56] References Cited

U.S. PATENT DOCUMENTS

| | | |
|---|---|---|
| 40,163 | 10/1863 | Fitch . |
| D. 50,119 | 1/1917 | Bessolo . |
| D. 54,250 | 12/1919 | Fletcher . |
| 171,463 | 12/1875 | Witsil . |
| D. 234,182 | 1/1975 | Mann et al. . |
| 296,492 | 4/1884 | Wheeler . |
| D. 304,797 | 11/1989 | Perkins . |
| 417,010 | 12/1889 | Ekman . |
| 720,202 | 2/1903 | White . |
| 731,329 | 6/1903 | Till . |
| 1,182,785 | 5/1916 | Morrison . |
| 1,843,223 | 2/1932 | Hasseler . |
| 2,802,259 | 8/1957 | Stoner . |
| 2,822,845 | 2/1958 | Medlin . |
| 3,333,295 | 8/1967 | Spets . |
| 3,609,800 | 10/1971 | Rollband . |
| 3,681,846 | 8/1972 | Gerber . |
| 4,172,306 | 10/1979 | Hopkins . |
| 4,200,961 | 5/1980 | Mueller . |
| 4,519,136 | 5/1985 | Walker . |
| 4,569,103 | 2/1986 | Taurinskas . |
| 4,617,734 | 10/1986 | Parkinson . |
| 4,759,126 | 7/1988 | McCoy et al. . |
| 5,080,629 | 1/1992 | Ellison . |
| 5,216,812 | 6/1993 | Lyons . |
| 5,403,230 | 4/1995 | Capriglione, Sr. . |

*Primary Examiner*—Willis Little
*Attorney, Agent, or Firm*—Hovey, Williams, Timmons & Collins

[57] ABSTRACT

A utensil is provided for facilitating the opening and removal of meat from crab legs or other types of shellfish. The utensil has an elongated handle portion and a bifurcated head section joined to the handle portion and provided with separate elongated first and second tine segments disposed in spaced, directly opposed, generally parallel relationship with the space therebetween being no greater than about twice the normal thickness of the shell of the shellfish. The first tine segment has a relatively wide planar surface facing a relatively narrow, toothed surface of the second tine segment. The second tine segment is of greater length than the first tine segment. The outermost end of the first tine segment is provided with a beveled shell-guiding face which serves as a fulcrum surface and extends in a direction toward the teeth of the second tine segment for facilitating direction of the shell into contact with the teeth during successive up and down manipulations of the utensil to effect opening of the shellfish shell. The toothed second tine is first slipped under the shell of the shellfish and the utensil oscillated up and down as it is forced forwardly whereby the toothed surface supported by the fulcrum point of the outer end of the first fine segment functions to sever the shell and expose the meat for ready removal.

20 Claims, 5 Drawing Sheets

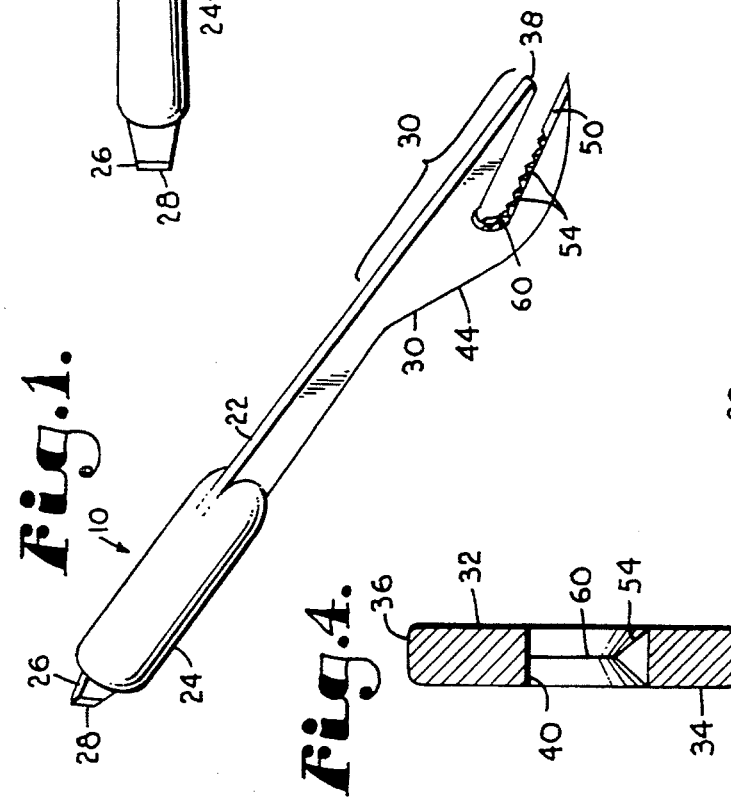
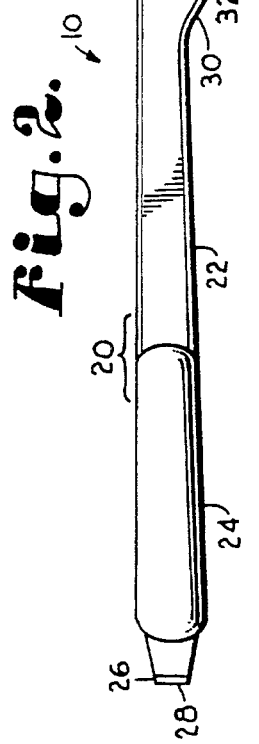
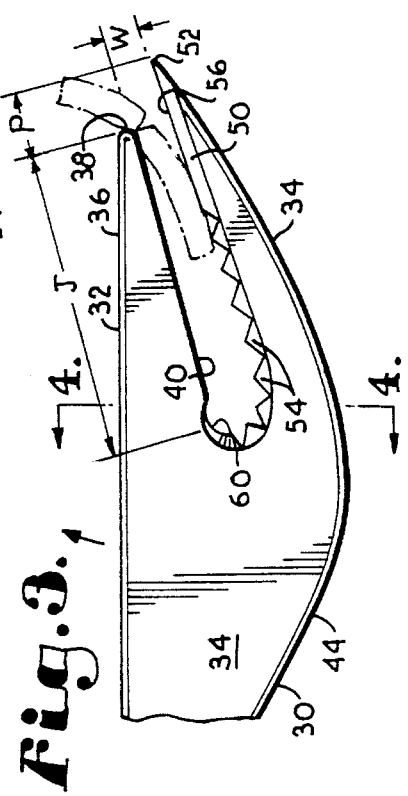
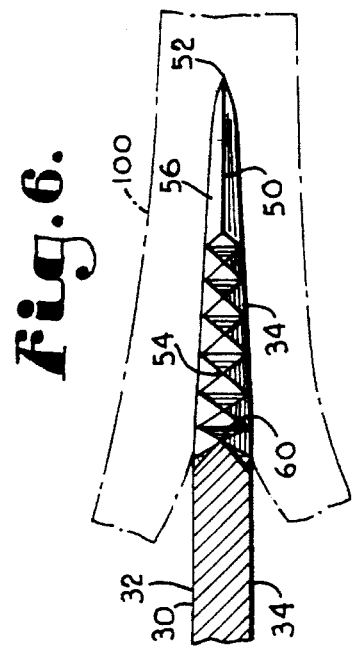
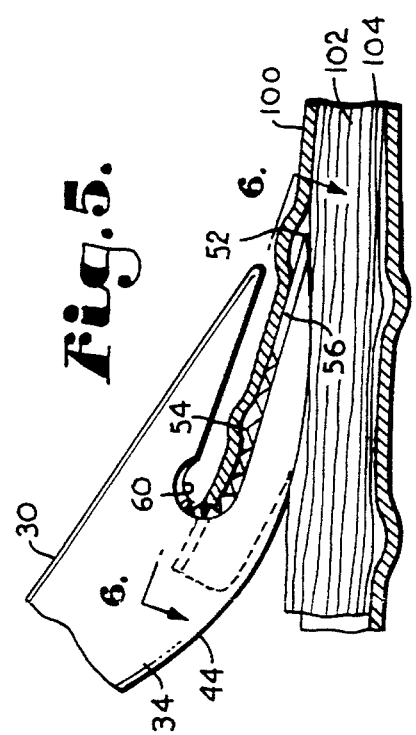

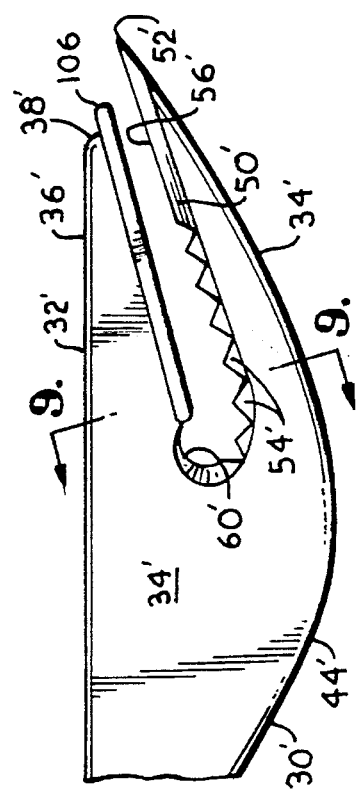
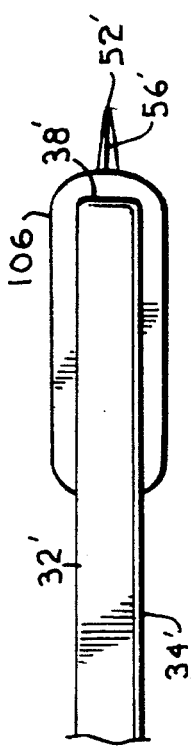
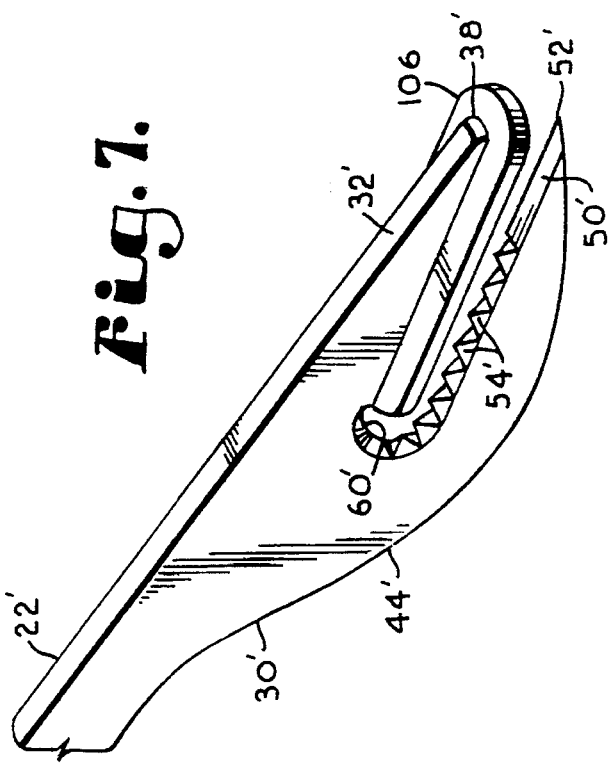
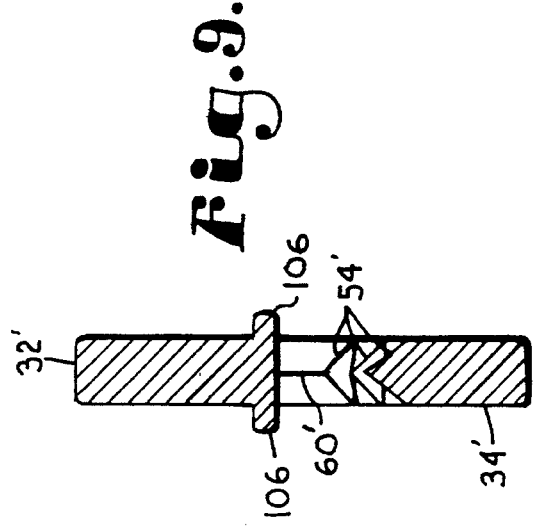

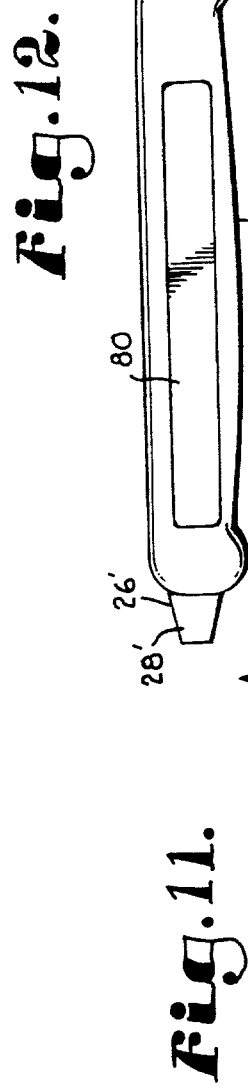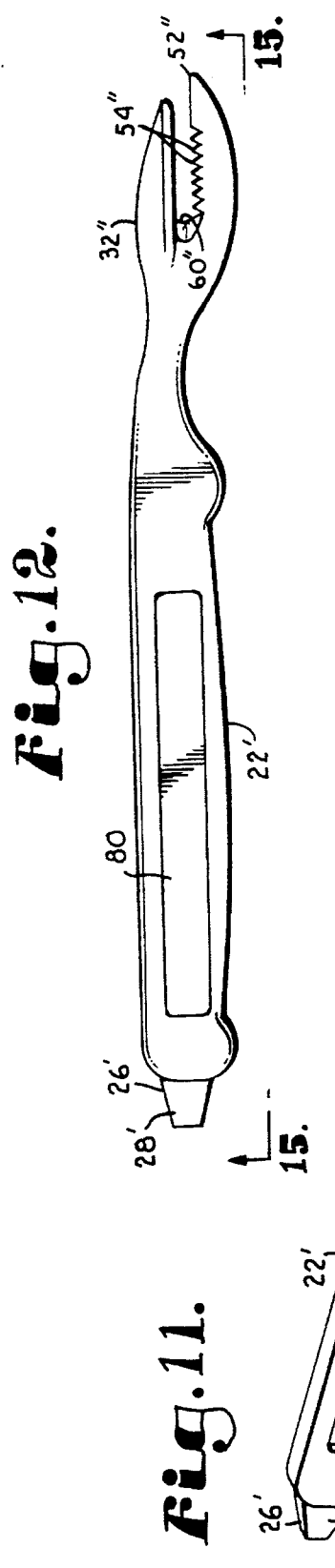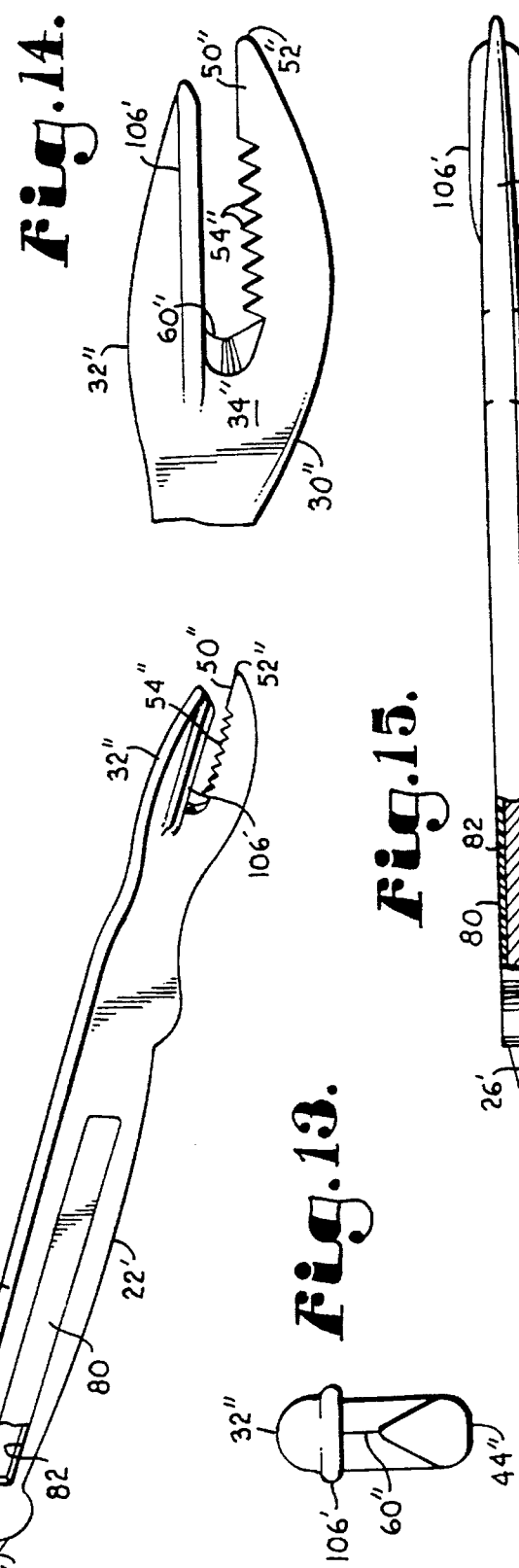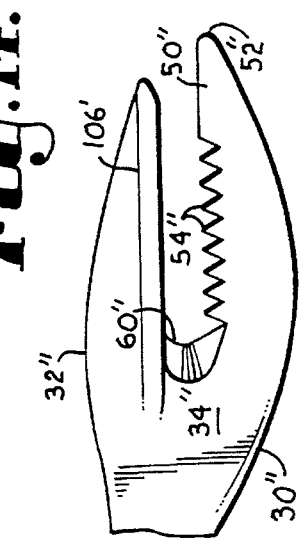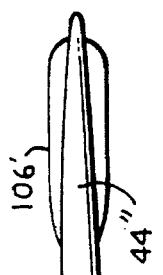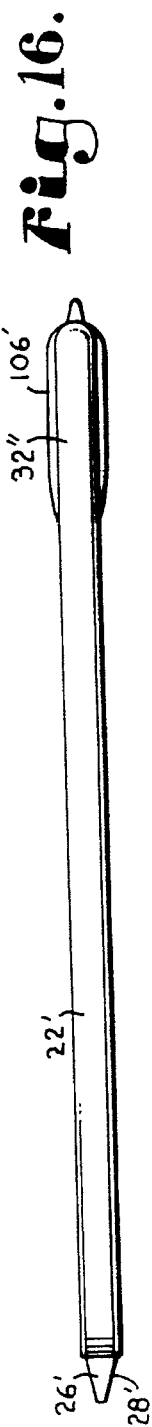

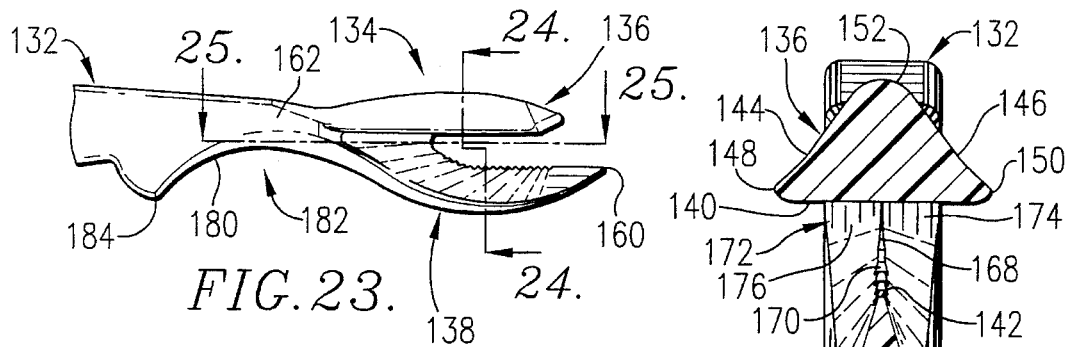
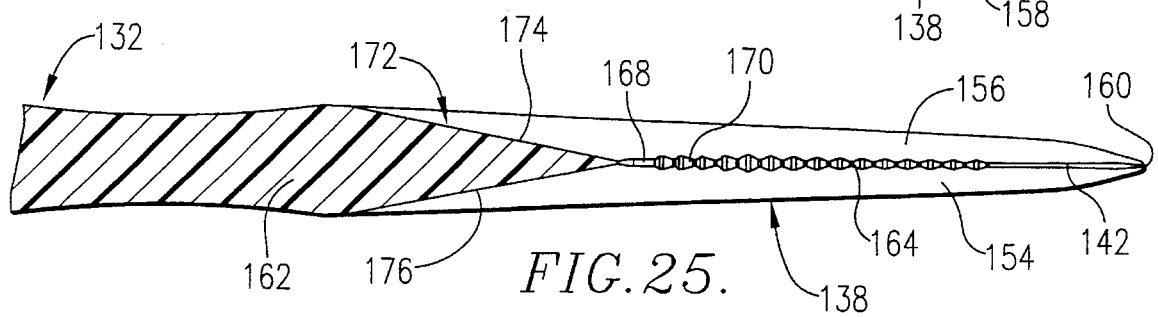
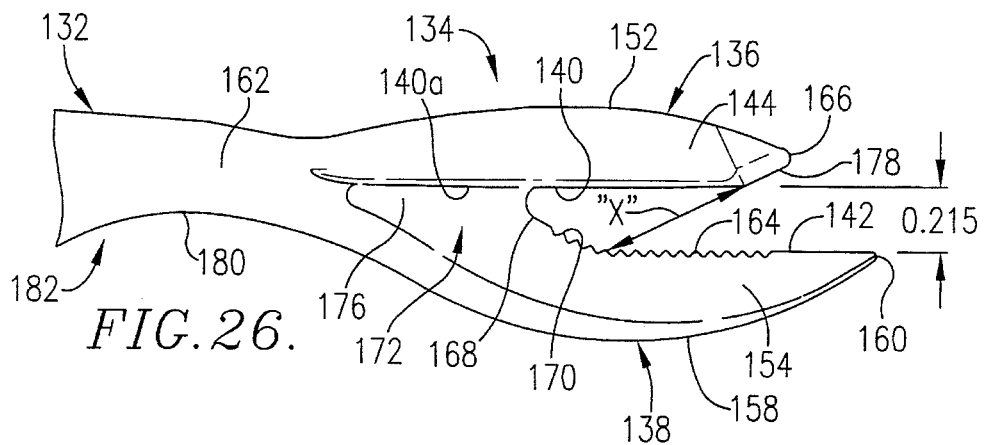
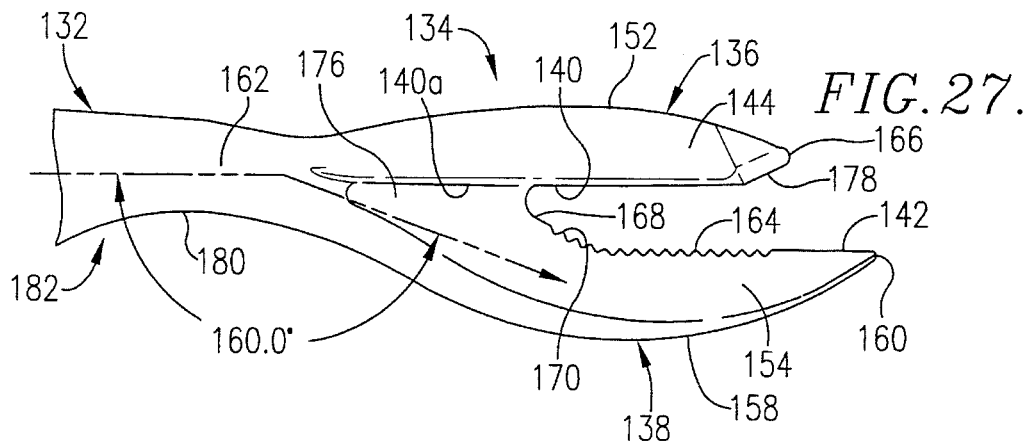

5,613,904

UTENSIL FOR OPENING THE SHELLS OF CRUSTACEANS

RELATED APPLICATIONS

This application is a continuation in part of application Ser. No. 08/533,374 filed Sep. 25, 1995, now abandoned, and Application Ser. No. 08/595,066 filed Feb. 1, 1996, pending.

BACKGROUND OF THE INVENTION

1. Field of the Invention

This invention relates to a utensil for facilitating the opening and removal of meat from crab legs or other types of shellfish, and particularly to a utensil that is useful in severing the shell of a shellfish, digging meat out of an opened shellfish if the meat has not been fully exposed by the severing operation, and for cutting knuckle segments or other areas of the shell which are normally difficult to crack and open, thus exposing the meat for extraction. The utensil also has utility for severing a shrimp shell along the alimentary canal line so that the canal may thereafter be quickly and easily be removed from the shrimp body.

2. Description of the Prior Art

Crustaceans such as shrimps and crabs are frequently prepared for eating by boiling the shellfish in water and then serving the cooked products still in the shell. The shell must be removed or broken away from the meat before the meat can readily be consumed. Boiling or broiling of a crustacean such as a crab typically does not change the characteristics of the shell to an extent that it can be readily removed from the meat.

It has been common practice for many years to use a bifurcated, pivoted handle, nutcracker-type of instrument to crack the shells of crab legs or other types of shellfish in order to facilitate removal of the shellfish meat from the protective shell. These utensils have found wide-spread acceptance for opening of shellfish shells, primarily because there has been no reasonable alternative utensil. However, the nutcracker-type utensils are relatively expensive and present restaurants with a cost problem because of the relatively high percentage of loss that is experienced as a result of customer pilferage. Furthermore, these utensils are not particularly useful in the case of shells that are somewhat soft, and mere cracking of the shell often does not allow a person to then easily remove meat from the cracked shell.

Many persons experiencing frustration with the inadequacy of nutcracker-type utensils for opening crab leg shells, particularly in circumstances where the shell is somewhat soft but of tough characteristics, have resorted to the use of a common table fork in an effort sever the shell. One of the tines of the fork is inserted under the shell and the person then lifts up on the fork handle in an effort to tear the shell body. Although this may accomplish the intended result in certain instances, many times such misuse of the fork simply results in bending of the fork tine, thus again causing the restaurant significant losses because of cost of replacing bent forks.

SUMMARY OF THE INVENTION

The utensil of this invention is a one-piece tool that may be molded as a unitary body at relatively low cost and which permits the user to more quickly and easily sever the shell of a crustacean for full axis to the meat therein than previously available instruments such as a nutcracker-type of utensil. In particularly, the utensil has an elongated handle portion with an integral bifurcated head having a relatively broad first tine segment and a longer, relatively narrow, second tine segment parallel with the first segment and provided with a series of teeth therein in facing relationship to the broad first tine segment. The spacing between the tine segments is no greater than about twice the normal thickness of a crustacean shell to be opened.

The first relatively broad tine segment has an inclined guide face on the outermost extremity thereof strategically positioned to serve the dual function of providing a fulcrum point for the serrated or toothed tine segment of the utensil during oscillation of the utensil to sever a crustacean shell, and also operable to direct the shell toward the opposed serrated second tine segment to facilitate cutting of the shellfish shell.

By virtue of the face that the utensil may be molded of plastic but still has greater utility than conventional, much more expensive, metal nutcracker-type crab shell crackers, the utensil of this invention may be made available by restaurants for their customers' use, as a give-away item, which may incidently have the name of the restaurant thereon for advertising purposes. Similarly, retail outlets of crustaceans, such as grocery stores or the like, may offer the utensil hereof as a gift at the time of sale of the crab lets or other crustacean product, as an incentive promoting the sale of a particular shellfish product.

The utensil also is desirably provided with a relative narrow, progressively increasing width transition zone between the serrated tine segment and the handle portion which allows the severed area of the shellfish shell to pass thereover without substantial impediment during use of the utensil. In this manner, more efficient cutting of the shell is obtained without significant collateral severing or tearing of the shellfish meat.

Users of the utensil hereof readily comprehend the manner of use of the same without significant use instruction being required. This is attributable in large measure to the fact that the operational mode of the utensil is substantial discernable from observing its construction. Furthermore, once a user has seen the use of the utensil demonstrated, the operational mode may readily be perceived and duplicated.

BRIEF DESCRIPTION OF THE DRAWINGS

FIG. 1 shows a three-quarter perspective view of one form of the present invention.

FIG. 2 shows a side view thereof.

FIG. 3 shows an enlarged partial side view of the subject embodiment of the invention.

FIG. 4 shows a cross-sectional view taken along section lines 4—4 of FIG. 3.

FIG. 5 shows a cross-sectional view of a portion of shellfish operable engaged by the subject embodiment of the invention.

FIG. 6 shows a cross-sectional view the subject embodiment of the invention engaging the portion of shellfish, taken along section lines 6—6 of FIG. 5.

FIG. 7 shows a fragmentary three-quarter perspective view from above of another modified form of the utensil involving a plate member fixed enteriorly of the upper bean or lip.

FIG. 8 is a side view of the utensil of FIG. 7 with the exception that the plate member unlike FIG. 3 is shown attached to the underside of the upper jaw as in FIG. 7.

FIG. 9 is a view taken along the lines 9—9 of FIG. 8 in the direction of the arrows.

FIG. 10 is a top plan view of the working section of the shellfish eviscerator being a view looking down from the top of FIG. 8 and FIG. 9.

FIG. 11 is a three-quarter perspective view from above and the front or operating end of a third modified form of the invention.

FIG. 12 is a side view of the utensil of FIG. 11.

FIG. 13 is a view taken from left to right in FIG. 12 showing the rear end of the utensil of FIGS. 11–16, inclusive.

FIG. 14 is an enlarged fragmentary view of the right-hand end of the utensil as illustrated in FIGS. 11 and 12 and showing the engaging and cutting apparatus of the utensil in detail.

FIG. 15 is a view taken along the lines 15—15 of FIG. 12 in direction of the arrow with a portion of the handle cut away to better illustrate the construction.

FIG. 16 is a top view of the utensil of FIG. 12.

FIG. 23 is an enlarged fragmentary view of the head end of the utensil.

FIGS. 24 and 25 are cross-sectional views taken long the lines 24—24 and 25—25 respectively of FIG. 23.

FIG. 26 is an even larger fragmentary view of the head section of the utensil and illustrating the preferred dimensions of the space between the tine segments of the head as well as the angle of the shell-guiding face on the shorter of the tine segment.

FIG. 27 is an enlarged fragmentary view similar to FIG. 27 and illustrating the preferred angularity of the head of the utensil with respect to the longitudinal axis of the handle portion thereof.

Figure 17:
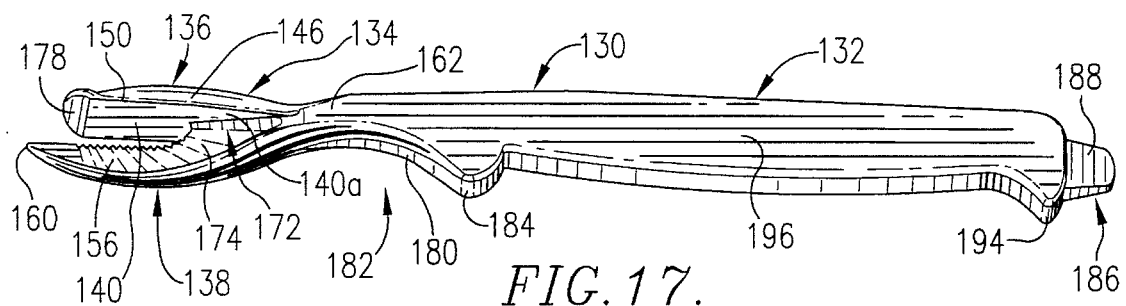
FIG. 17 is a side elevational view of one side of a preferred embodiment of the utensil of this invention.
Figure 19:
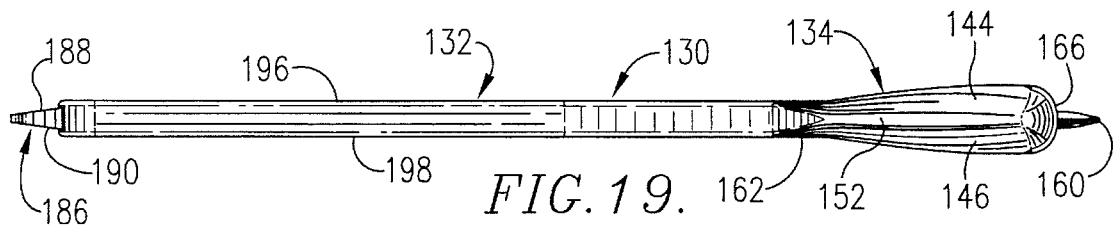
FIG. 19 is a plan view of the utensil.
Figure 18:
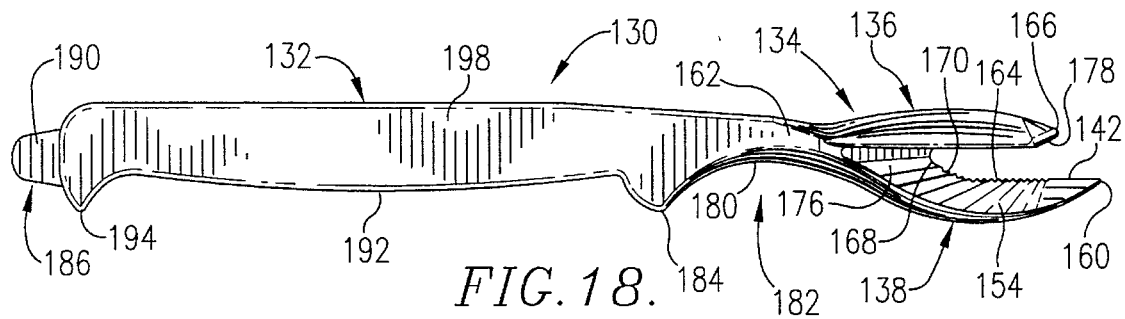
FIG. 18 is a side elevational view of the other side thereof.
Figure 20:
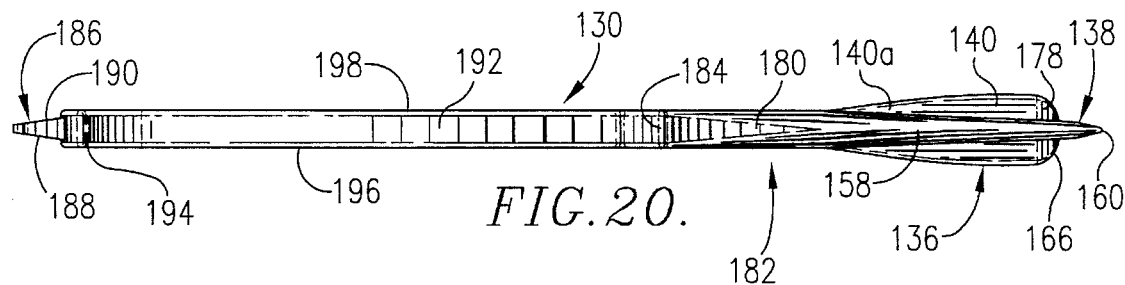
FIG. 20 is a bottom view of the utensil.
Figure 22:
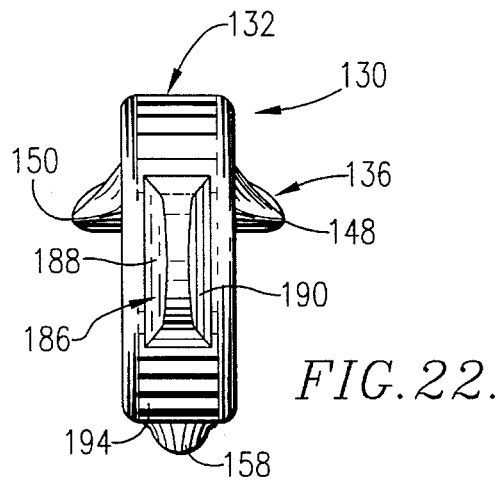
FIG. 22 is an end view of the opposite handle portion end of the utensil.
Figure 21:
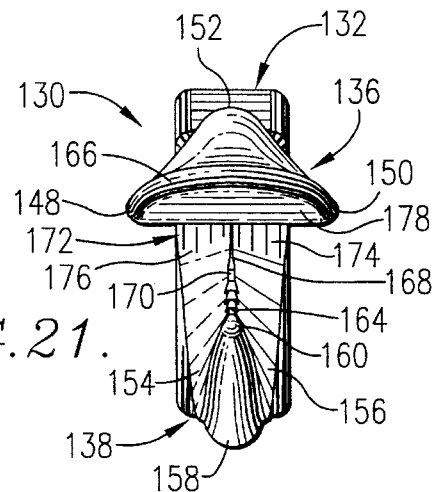
FIG. 21 is an end view of the bifurcated head end of the utensil.

DETAILED DESCRIPTION OF THE PREFERRED EMBODIMENTS OF THE INVENTION AS DEPICTED IN FIGS. 17–27

The preferred embodiment of the present invention is illustrated in FIGS. 17 to 27, inclusive. In those figures, an elongated, monolithic utensil broadly designated by the numeral 130 is preferably molded of a relatively durable synthetic resin material. The utensil 130 includes a handle portion 132 and a bifurcated head section 134 integral with handle portion 132.

As can perhaps best be seen from FIGS. 23–27, head section 134 includes first and second tine segments 136 and 138, respectively, which are integrally connected to handle portion 132 and are located in generally parallel, spaced relationship one from another. It is to be noted that the second tine segment 138 is of longer longitudinal length than the length of first tine segment 136 longitudinally thereof.

First tine segment 136 is substantially wider than second tine segment 138 and has a relatively wide planar under surface 140 which directly opposes the relatively narrow upper surface 142 of the second tine segment 138. It is to be observed from FIGS. 23, 26 and 27 that the surfaces 140 and 142 are in direct opposition and in essentially parallel relationship. The two side faces 144 and 146 of first tine segment 136 extend upwardly from respective outer elongated side margins 148 and 150 of planar surface 140 and converge as the apex 152 of first tine segment 136 is approached. Preferably, the margins 148 and 150 comprising the zone of merger of faces 144 and 146 with planar surface 140 define somewhat sharp edges for cutting of a crustacean shell as will be described.

Viewing FIG. 24, it can be seen that the second tine segment 138 has two opposed side faces 154 and 156 which merge with the relatively narrow upwardly facing surface 142 and diverge as the lowermost, longitudinally curvilinear bottom surface 158 of second tine segment 136 is approached. It can be seen from FIG. 24 that inclined faces 154 and 156 of second tine segment 138 are longitudinally curved and merge smoothly with upper surface 142 and the curved bottom surface 158. The curvature of bottom surface 158 of second tine segment 138 is such that the arcuate face presented by such surface represents a relatively smooth curve extending from the outer tip 160 of second tine segment 138 to the neck section 162 of handle portion 132.

It is also to be seen from FIGS. 23–27 that the upper surface 142 of second tine segment 138 is provided with a series of upwardly projecting serrations 164 serving to define a series of teeth which extend along the length of upper surface 142 from a point inboard of tip 160 of second tine segment 138 that is approximately aligned with the outermost tip 166 of first tine segment 136. Of further note is the fact that the second tine segment 138 is provided with an inclined, relatively narrow surface 168 which also has a series of serrations or teeth 170 that project upwardly toward planar surface 140. The teeth 170 extend from the series of teeth 164 through at least one-half of the length of narrow surface 168 between serrations 164 and the planar surface 140. The angularity of surface 168 with respect to surface 142 including serrations 164 therein is approximately 45° with respect to the longitudinal length of serrated surface 164. The outer length of unserrated surface 142 of second tine segment 138 extends to the tip 160 thereof.

It is also to be observed from FIG. 24 that the maximum transverse width of first tine segment 136 as represented by the planar surface 140 thereof is significantly greater than the transverse width of surface 142 including the teeth 164 therein. Furthermore, the overall transverse width of planar surface 140 of first tine segment 136 is at least about three times the maximum transverse width of second tine segment 138 as represented by the zones of merger of side faces 154 and 156 with curved bottom surface 158. The number of teeth provided in the upper surface 142 of second tine segment 138 may be varied, but preferably there are at least about ten of the teeth in surface 142, and at least about four teeth in the inclined surface 168. The height of each serration presenting a tooth 164 or 170 is approximately equal to the width thereof at the base of each tooth.

As depicted in FIGS. 25–27, it is to be seen that the side faces 154 and 156 of second tine segment 138 diverge in a direction from tip 160 to the point of merger of such surfaces with neck 162 of handle portion 132.

The second tine segment 138 is also provided with a transition zone 172 which extends between the relatively narrow inclined surface 168 and neck portion 162 of handle portion 132. The serrated and non-serrated inclined surface 168 facing the space between parallel surfaces 140 and 142 of first and second tine segments 136 and 138, respectively, comprises the apex of the transition zone 172 while opposed side faces 174 and 176 of zone 172 diverge and transition smoothly into the neck portion 162 of the handle portion 132. The planar surface 140 extends into overlying relationship to transition zone 172 and has essentially triangular portions 140a which directly overlie corresponding faces 174 and 176.

The outermost end of first tine segment 136 remote from handle portion 132 has an inclined shell-guiding face 178 which is at an angle with respect to the planar extent of surface 140. The angularity of face 178 with respect to surface 140 is chosen to cause the shell of the crustacean passing over guide surface 178 to be brought into direct contact with the serrated teeth-defining portion of narrow surface 142 of second tine segment 138. Preferably, guide face 178 is at an angle of about 25° from a plane through under surface 140. Viewing FIG. 10, the distance along the line "X" from the lowermost extremity of guide face 178 to the first tooth of the series of teeth 168 is approximately 0.5 inch. It is also to be observed from FIG. 26 that the outermost tip 166 of first tine segment 136 is radiused to present an edge which is not only transversely curved, but also is curved across the width of first tine segment 138 as can be best seen from FIGS. 17, 19 and 20.

The distance between surfaces 140 and 142 is no greater than about two times the normal thickness of the shell of a crustacean to be opened by utensil 130, and preferably is of about 0.215 inch. In addition, head section 134 is at an angle longitudinally thereof with respect to the longitudinal axis of handle portion 132. Such angularity is desirably about 160° as indicated schematically in FIG. 27 of the drawings.

Viewing FIGS. 17, 18, 23, 25 and 26, it is to be seen that the under part of handle portion 132 at the neck 162 thereof has a curvilinear relieved part 180 defining a recess 182 for accommodating grasping of the utensil 130 for use in opening a shell of a crustacean. Projecting portion 184 of handle portion 132 located in juxtaposition to part 180 allows a user to grasp utensil 130 with a forefinger in relieved part 180 while the projecting portion 184 rests between the user's forefinger and middle finger.

A chisel element 186 is provided on the extremity of handle portion 132 opposed to head section 134 and has opposed faces 188 and 190 which converge as the outer extremity of the chisel element 186 is approached to present a relatively blunt device for further facilitating use of utensil 130 as will be described.

The lower surface 192 of handle portion 132 between chisel element 186 and projecting portion 184 is longitudinally curved with the greatest width thereof being at the central part of the handle portion 132 to again make the utensil 130 more comfortable to hold during use. Grasping of the utensil 130 is aided even if the user's fingers become somewhat greasy during use by virtue of a rear projecting segment 194 adjacent chisel element 186, as is most apparent from FIGS. 17 and 18.

The major side surfaces 196 and 198 are relatively flat and serve as a convenient medium for a trademark identifying the utensil 130, or for an individual logo of a restaurant, retail outlet, or other business entity that distributes utensils 130 either for use at a table in the case of restaurants, or as a promotional or premium-tied item in the instance of grocery stores or the like. In this respect, one feature of utensil 130 is the fact that by virtue of molding of the monolithic body from synthetic resin material, the resin may be colored with any desired pigment as may be selected by a customer such as a restaurant which can then be a unique identifier of that particular business. Conventional metal nutcracker-type devices cannot be so color-coded, or provided with a printed or molded in identifying name.

In use, a person grasps utensil 130 by handle portion 132 with the user's forefinger in recess 182 and the remaining figures curled around the extent of the handle portion 132 between projecting portion 184 and projecting segment 194. The person than grasps the crustacean such as a crab leg in his or her other hand, preferably using a protective article such as a glove or napkin, in a position such that the second tine segment 138 may be inserted through an exposed end of the crab leg into the area between the meat of the crab leg and the shell. The utensil 130 is forced forwardly until the outermost margin of the shell comes into engagement with the inclined surface 168 of second tine segment 138. During insertion of second tine segment 138 into the open end of the shell, the curved bottom surface 158 of second tine segment 138 prevents the second tine segment 138 from severing the meat within the crustacean shell, in that the surface 158 is curved both transversely and longitudinally thereof. The outer tip 160 of second tine segment 138 is relatively sharp so that it may be readily pushed forwardly beneath the crustacean shell. Noteworthy in this respect is the fact that the lower second tine segment 138 is longer longitudinally thereof than the longitudinal length of first tine segment 136 so that the upper first tine segment 136 does not significantly interfere with insertion of the lower second tine segment 138 beneath the shell of the shellfish.

At that point, the user pulls upwardly on the handle portion 132 of utensil 130 while continuing to push the utensil 130 forwardly toward the shell. This combined upward and forward movement of the utensil 130 causes the shell to be directed toward the toothed portion 142 of second tine segment 138 and preferably substantially at the juncture of the teeth 164 with the teeth 170 of inclined surface 168. Continuation of such upward and forward manipulation of utensil 130 causes teeth 164 to initiate a ripping of the shell which is enhanced by the angular position of the teeth 170 with respect to teeth 164 of surfaces 142 and 168, respectively. The teeth 164 serve a secondary function of operating as a frictional surface engaging the part of the shell that has not yet been severed ahead of the sever point which greatly facilitates ripping of the shell and overcomes any tendency for the utensil to back off from the sever point as a result of the toughness and rigidity of the shell material.

During such upward and forward thrusting of the utensil 130, the area of the shell that is severed passes along the smooth diverging faces 174 and 176 of transition zone 172 and the juncture of second tine segment 138 with first tine segment 136 does not impede such forward movement of head section 134. As the utensil 130 is pivoted upwardly as described to initiate severing of the shell, the relatively wide planar surface 140 of first tine segment 136 rests flatly against the outer surface of the shell and contributes to effective ripping, tearing and cutting of the crustacean shell as the user continues to apply forward and upward forces to the handle portion 132. The guide face 178 acts as a fulcrum point during such upward and forward thrusting of utensil 130 and because of the angularity of such guide face with respect to planar face 140 and relative to the underlying toothed surfaces 164 and 170 of surfaces 142 and 168, optimum positioning of the fulcrum point is maintained throughout the upward rotational movement of the utensil 130.

After the user has cut through the shell to a maximum extent by pulling upward on the handle portion 132 in concert with application of forward pressure, the utensil 130 is rotated in the opposite direction and the process repeated. Although the procedure has of necessity been described as a series of discreet, finite events, it is to be recognized that in practical use of utensil 130 to open a crab shell or the like, the user rotates the utensil 130 in relatively rapid up and down motions to quickly and efficiently open the crab or other crustacean shell as the sever line gets longer and longer along the length of the shell.

In instances where the tine segments 136 and 138 encounter resistance in cutting through very hard areas of shell and particularly at knuckle portions thereof, the entire utensil 130 may be rotated about the longitudinal axis of handle portion 132 thereby allowing the user to insert the first tine segment 136 into the space between the shell and the meat therein so that the person may then exert a rotational up and down force on the utensil 130 to permit cutting of the shell with one of the relatively sharp edges 148 or 150 of first tine segment 136 as the shell is trapped between the first tine segment 136 and the second tine segment 138. The inclined guide face 178 of first tine segment 136 facilitates insertion of the first tine segment 136 into the crab shell between the meat and the inner surface of the shell.

Utensil 130 may also advantageously be used for deveining of shrimp. The shell of the shrimp is severed on the alimentary canal using the first and second tine segments 136 and 138 as described above. After severing of the shell along that canal, the utensil 130 may be reversed in the hands of the user and the chisel element 186 then used to dig out the inedible residue in the alimentary canal so that when the shell is removed from the shrimp, it is immediately ready to be eaten.

DETAILED DESCRIPTION OF THE EMBODIMENTS OF THE INVENTION SHOWN IN FIGS. 1–11

An eating utensil useful in food preparation and consumption generally according to the present invention is shown in FIGS. 1 and 2 and referred to with reference number 10.

The utensil 10 includes a handle portion 20 including a stem 22 and a grip 24 at the proximate end of the stem 22. The stem 22 may be, for example, on the order of one-eighth inch in thickness and five-eights inch in depth, or may be otherwise sized in keeping with the styling of eating utensils as is known to those skilled in the art. Likewise, the handle portion 20 is shown without stylistic representation, but those skilled in the art will recognize that stylistic adaptation may be made without materially altering the subject invention.

A chisel end 26 is provided on the proximate end of the grip 24. The chisel end 26 includes a sharpened chisel end 28 extending opposite the stem 22.

At the distal end of the stem 22 is the jaw portion 30 of the utensil 10. The jaw portion 30, as shown in more detail in FIGS. 3 and 4, includes an upper jaw element 32 and a lower jaw element 34.

The upper jaw element 32 is preferably substantially the same thickness as the thickness of the stem 22. The upper jaw element 32 has a planar top surface 36 extending from the top of the stem 22 to a secondary fulcrum end 38 at the distal end of the upper jaw element 32. The secondary fulcrum surface 38 is semi-cylindrical to present an exterior curve connecting the top planar surface 36 and the upper jaw surface 40. The upper jaw surface 40 angles downwardly with respect to the top planar surface 36 at an angle in the range of 10 to 30 degrees, extending a distance J into the jaw portion 30. This distance J determines and defines the operating depth of the utensil 10, and is preferably in the range of ¾ to 1 and ½ inches.

The lower jaw element 34 includes a parabolically curved primary fulcrum surface 44 which is the bottom surface of the lower jaw element 34. From a proximate end which joins the stem 22, the primary fulcrum surface 44 curves downwardly and then upwardly to intersect the lower jaw surface 50. The lower jaw surface 50 is parallel to and spaced a distance W away from the upper jaw surface. The distance W is preferably in the range of ¼ to ⅜ inches. At the intersection of the lower jaw surface 50 and the primary fulcrum surface 44 is the penetrating point 52.

As with the upper jaw surface 40 the lower jaw surface 50 extends a distance J into the jaw portion 30. The lower jaw element 34 also extends distally beyond the secondary fulcrum 38 a distance P to the penetrating point 52. The distance P is preferably in the range of ¼ to ⅜ inches, and defines the penetrating depth for the utensil 10. Furthermore, the lower jaw element 34 preferably tapers and narrows in thickness along the entire length of the lower jaw surface 50, initially being the same thickness as the stem and jaw portion, and tapering to the penetrating point 52.

At the proximate end of the upper jaw surface 40 and the lower jaw surface 50, and connecting therebetween is the separating blade 60. AS shown, the separating blade 60 is spiroidal in form, curving upwardly from the lower jaw surface 50 to the upper jaw surface 40, and directed toward the penetrating point 52 and secondary fulcrum surface 38. A straight blade may be used in lieu of the spheroidally formed blade 60.

The lower jaw surface 50 includes upwardly directed, pyramidally shaped teeth 54. As shown, there are six teeth 54. At the distal end of the lower jaw surface is an upwardly extending cutting blade 56 extending at least the distance P. The teeth 54 extend from the cutting blade portion 60 to the outer blade portion 56.

The following general description applies to the three modifications in the various views (modification 1, FIGS. 1–6, inclusive; modification 2, FIGS. 7–10, inclusive; and modification 3, FIGS. 11–16, inclusive). If the number is single and not primed it applies only to FIGS. 1 to 6. If the number is single primed and unprimed, it applies to both FIGS. 1–6, inclusive and FIGS. 7–10, inclusive. If the numbers are double primed, they apply to FIGS. 11–16.

In operation, a user grasps the grip 24. As shown in FIGS. 5 and 6, the penetrating point 52 of the utensil 10 is driven through the shell 100 of a shellfish 102 containing meat 104. The user then manipulates the handle portion through a series of vertical oscillations, pivoting the jaw portion about the primary fulcrum surface 44 and the entire lower jaw under surface back and forth. During the oscillations, the utensil 10 is driven along the surface of the meat 104, with the penetrating point 52 and the teeth 54 and 60 severing the shell 100 for separation thereof from the meat 104. As the utensil 10 is so driven, the teeth 54 cooperate to frictionally engage the shell 100 and thereafter effect severing of the shell 100. By continuing this process, the utensil exposes the meat 104 for ready consumption.

As shown in FIG. 3 in shadow outline, difficult or remaining small pieces of shell 100 may be broken away from the meat 104 by inserting the shell 100 into the jaw portion 30 and pivoting the utensil 10. The shell 100 is then broken about the secondary fulcrum 38 and can easily be removed.

The utensil 10 is preferably made from molded synthetic resin material, although it may be made of steel, either being forged or molded, and appropriately machined where desired. The grip 24 may be formed as part of the handle portion 20 or may include shaped wooden pieces secured or riveted to the stem 22, as is known to those skilled in the art. Those skilled in the relevant art will recognize that all dimensions J, P and W represent exemplary, non-binding values given for the purpose of assisting in the understanding of the subject invention.

The utensil 10 offers several advantages, being easily manipulated to break away both large and small pieces of shell 100. The utensil 10 readily penetrates the shell 100 and cuts it away to expose the meat 104. Furthermore, the utensil 10 is entirely suitable for use as an eating utensil together with the common table utensils found at formal meal settings. The utensil 10 is easily maintained in the same manner as that of the more common table utensils.

Reference is heremade to FIGS. 7, 8, 9 and 10. Each one of these figures is analogous to one of the Figures in the first sheet of drawings, yet contains a new structural feature which aids in the function and action of the utensil.

With respect to all of the numbers up to and including 104 in the first sheet of Figures, FIGS. 1–6, inclusive, all of the numbers and parts numbered the same but primed are identical in FIGS. 7–10, inclusive. The sole difference between FIGS. 7–10, inclusive, and 1–6, inclusive is the presence in FIG. 7–10, inclusive of the widened plate 106 on the underside of the top jaw portion 32', 36' and 38'.

The purpose of member 106, which comprises a rectangular elongate member extending the full length and more of top portion 32 is to prevent the upper portion of the utensil, when it is being forced into the shellfish carapace, as in FIG. 5, from puncturing or breaking through the carapace and preventing the desired shearing and cutting action previously described. In FIG. 3, the presence of the member 106 permits a greater grasp of the carapace and the forced cutting action of the lower portion thereof. The same is true of FIG. 6.

In operation, the user first grasps grip 24. The penetrating point of the lower arm of the utensil is driven with respect to the shell of a shellfish 102. The user then manipulates the handle portion through a series of arcuate (from vertical to essentially horizonal) thus pivoting the jaw portion on the outside surface of the carapace about primary fulcrum surface 44 within the carapace against the lower jaw from point 52, the leading edge 56, the cutting members 60 and the arcuate cutting zone 60.

Viewing FIGS. 7–10, inclusive, it will be seen that an elongate semi-rectangular plate is fixed to the underside of the upper jaw 32', 36'. The plate is symmetrically secured to the underside (working underside) of the upper jaw and is of considerably greater width than the latter. This enables a much greater control of the carapace of eh shellfish when it is being cut open without losing the penetrating ability of the extended lower edge 52'. The beam or plate 106 could be shorter from the gripping end of the utensil or shorter from the working end of the utensil at 38'. However, the configuration shown, where there is a broad contact of the plate with the carapace in opposition to the elements on the lower beam gives optimum performance.

DETAILED DESCRIPTION OF THE INVENTION AS DEPICTED IN FIGS. 12–16

Comparing the depiction of the invention as set out in FIGS. 11–16 with, first, the sheet with FIGS. 1–6 thereon, and, secondly, the sheet with FIGS. 7–10 thereon, it can be seen that on the left end of the handle, the chisel portions 26, 28 are retained. Furthermore, the "hammer" or striking portion 24 is not present in this embodiment as was the case of the invention of FIGS. 11–16. Although the useful function of breaking or crushing the shell by blows of the utensil is not present, the material and weight of the utensil is reduced, but there is now the opportunity for a panel of advertising to be inserted in one or both sides of the utensil.

An extension projecting downwardly opposite the like rear extension 108 aids in defining the grasping handle and keeps the user's grip from sliding forwardly into the working or tooth area.

The geometrical arrangement of FIGS. 1–6, inclusive and 11–16 differ from this embodiment in that the jaw opening is canted upwardly with respect to the longitudinal axis of FIGS. 1–6 and straight with respect to the longitudinal axis of FIGS. 11–16. Secondary cutting edges 106' are provided in the working mouth of the utensil as in FIGS. 11–16. Likewise, cutting edge 60" constitutes a variation of the arcuate cutter at the rear end of the mouth.

We claim:

1. A utensil for facilitating the opening and removal of meat from crab legs or other types of shellfish, said utensil comprising:

an elongated handle portion; and a bifurcated head section joined to the handle portion at one end thereof in a position to assist the user of the utensil in opening and removing all or a part of the meat from the shellfish, said head section including separate, elongated first and second tine segments, said first and second tine segments each having a surface portion with the surface portions being disposed in spaced, directly opposed, generally parallel relationship, the spacing between said opposed surface portions being no greater than about twice the normal maximum thickness of the shell of the shellfish, the surface portion of said first tine segment being of essentially planar configuration and of a width transversely thereof that is substantially greater than the transverse width of the surface portion of the second tine segment, said second tine segment being of greater length than said first tine segment and provided with a series of teeth along the length thereof in facing relationship to said planar surface of the first tine segment, said second tine segment being provided with a transition zone which merges with said handle portion and said planar surface of the first tine segment, said transition zone being configured to present a relatively narrow margin between the surface portions of said first and second tine segments in facing relationship to the space between tine segments and having faces which diverge as the handle portion is approached to allow the severed area of the shell to pass thereover without substantial impediment during use of the utensil.

2. A utensil as set forth in claim 1 wherein the outermost extremity of said first tine segment is beveled with respect to the longitudinal axis of the handle portion to present a shell-guiding face extending toward the teeth of said second tine segment for facilitating direction of the shell into contact with said teeth during successive up and down manipulations of the utensil to effect opening of the shellfish shell.

3. A utensil as set forth in claim 2 wherein said guide face is at an angle of approximately 45° with respect to the longitudinal axis of the handle portion.

4. A utensil as set forth in claim 2 wherein said guide face is located in approximate alignment with the outermost extent of the teeth of said second tine segment remote from the handle portion.

5. A utensil as set forth in claim 1 wherein said second tine segment is of generally triangular configuration transversely thereof.

6. A utensil as set forth in claim 1 wherein at least a portion of said relatively narrow margin is provided with teeth which extend toward the opening between the first and second tine segments.

7. A utensil as set forth in claim 1 wherein said narrow margin of the transition zone is located at an obtuse angle with respect to the longitudinal length of said other surface portion of the second tine segment.

8. A utensil as set forth in claim 1 wherein the longitudinally extending side edges of said first tine segment present cutting edges for severing the shell of the shellfish when the utensil is rotated about the longitudinal axis of the handle portion.

9. A utensil as set forth in claim 8 wherein said first tine segment is of generally triangular shape transversely thereof.

10. A utensil as set forth in claim 1 wherein said handle portion is provided with a shell-receiving recessed area therein extending longitudinally of the handle portion at the point of juncture thereof with the first and second tine segments to prevent substantial interference of the shell of the shellfish with up and down rocking motion of the utensil during use.

11. A utensil as set forth in claim 1 wherein the outermost extremity of said second tine segment presents a relatively sharp point.

12. A utensil as set forth in claim 11 wherein said second tine segment increases in width from the pointed extremity thereof as the handle portion is approached.

13. A utensil as set forth in claim 1 wherein the outer end of said first tine segment is positioned in disposition with respect to the teeth in said second tine segment to cause the outermost transversely-extending margin area of said first tine segment to serve as a fulcrum point during up and down rocking manipulation of the utensil to effect severing of the shell of a shellfish.

14. A utensil as set forth in claim 1 wherein said handle portion and the first and second tine segments are integrally interconnected as a single unit of molded synthetic resin material.

15. A utensil as set forth in claim 1 wherein said opposed surface portions of the first and second tine segments are spaced apart a distance of approximately 0.215 inch.

16. A utensil as set forth in claim 1 wherein the surface portion of the first tine segment is of a width transversely thereof approximately three times the transverse thickness of the second tine segment.

17. A utensil as set forth in claim 1 wherein the handle portion is joined to the first and second tine segments in disposition with the longitudinal axis of the handle portion at an angle of about 160° with respect to the major length of the zone of transition of the second tine segment with the elongated handle portion.

18. A utensil as set forth in claim 1 wherein is provided a chisel element on the end of the handle portion opposite the tine segments for facilitating removal of meat or inedible constituents of the shellfish from the shell.

19. A utensil as set forth in claim 1 wherein the margin of the second tine segment remote from the second tine segment is of arcuate configuration longitudinally thereof to minimize penetration of the second tine segment into the meat of the shellfish during opening of the shell thereof.

20. A utensil as set forth in claim 19 wherein said second tine segment has opposed faces which diverge as the margin thereof is approached in a direction away from the teeth in said second tine segment.

* * * * *